UNITED STATES PATENT OFFICE.

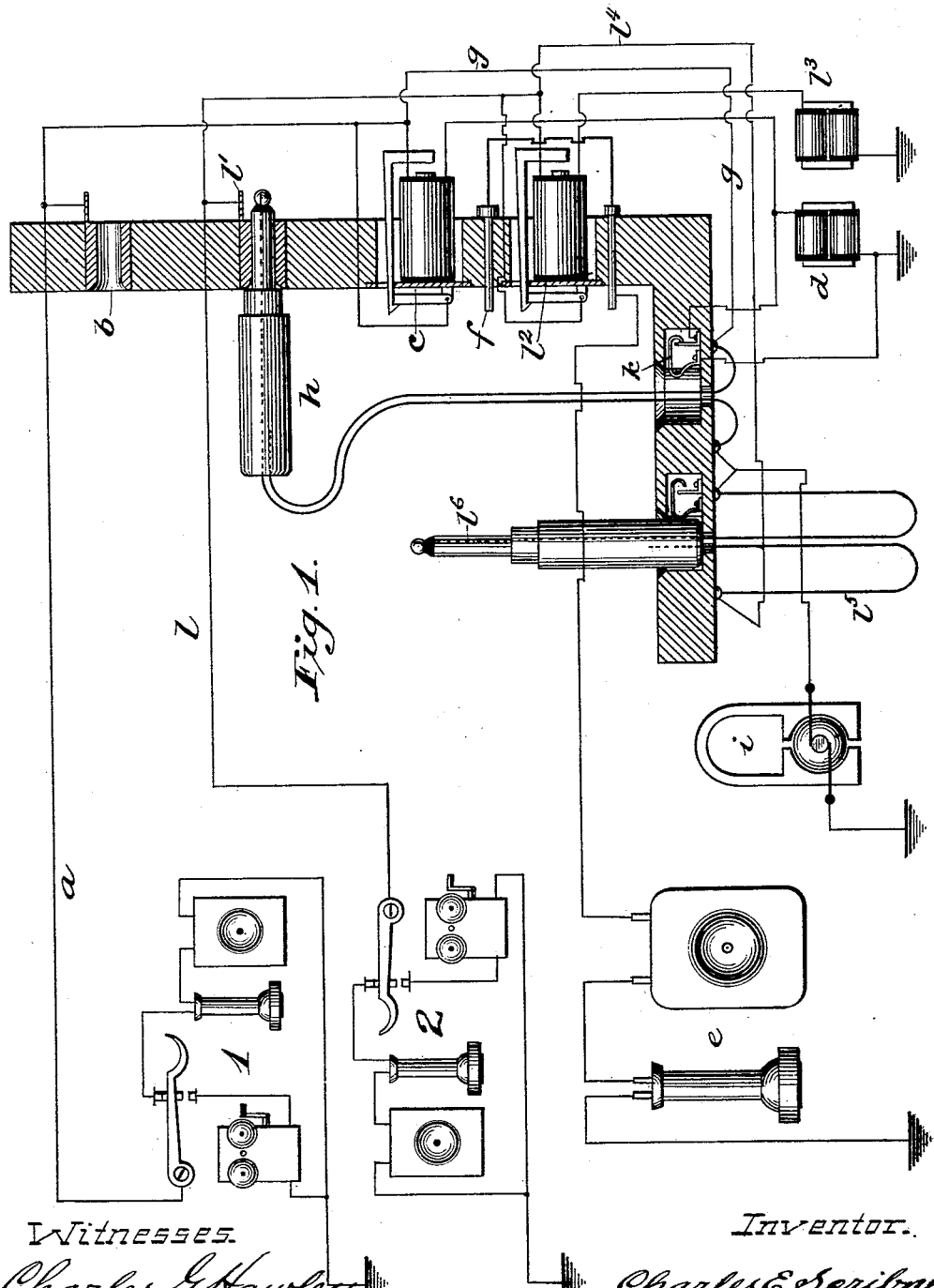

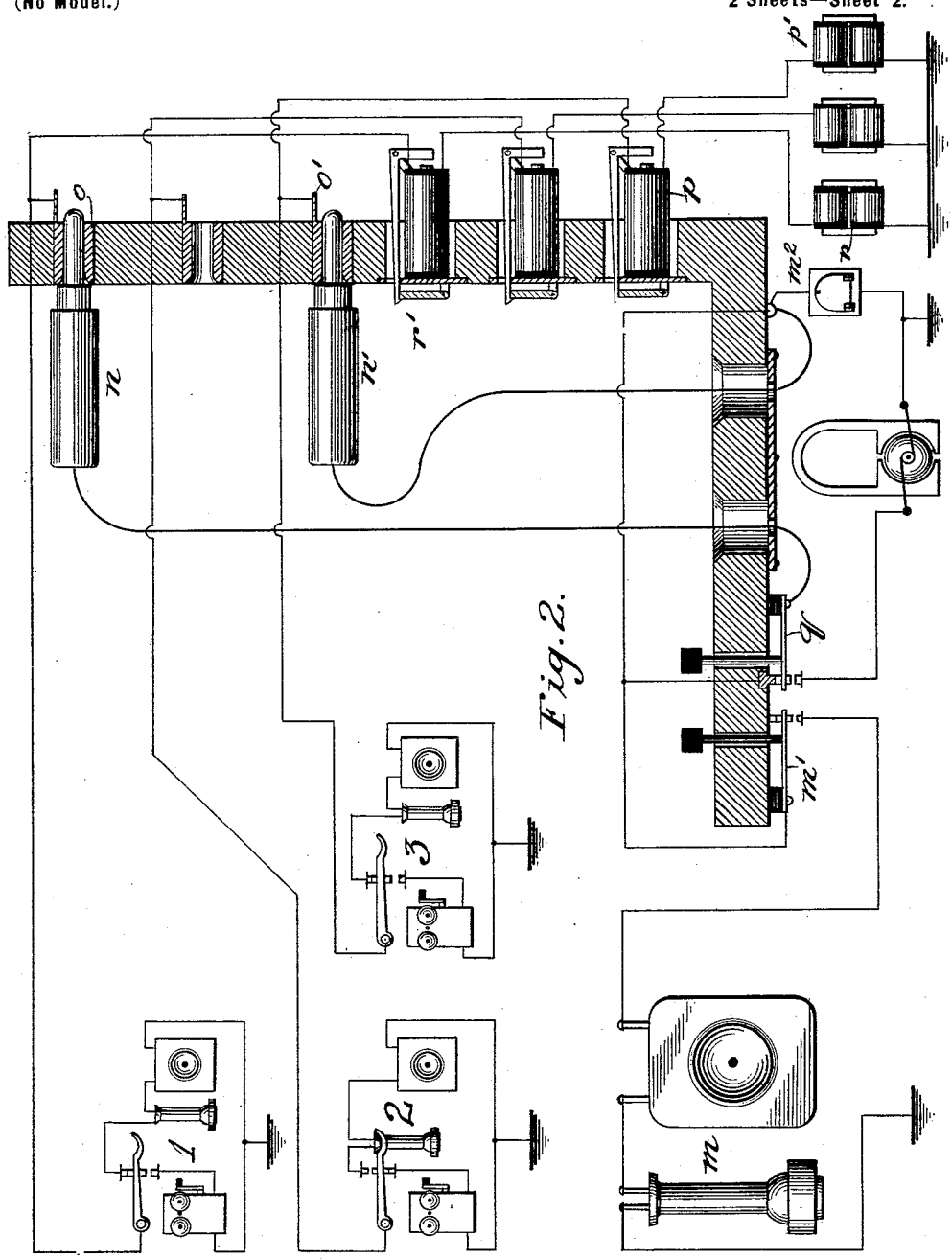

CHARLES E. SCRIBNER, OF CHICAGO, ILLINOIS, ASSIGNOR TO THE WESTERN ELECTRIC COMPANY, OF SAME PLACE.

TELEPHONE-EXCHANGE APPARATUS.

SPECIFICATION forming part of Letters Patent No. 684,317, dated October 8, 1901.

Application filed March 24, 1890. Renewed May 9, 1893. Serial No. 473,602. (No model.)

*To all whom it may concern:*

Be it known that I, CHARLES E. SCRIBNER, a citizen of the United States, residing at Chicago, in the county of Cook and State of Illinois, have invented a certain new and useful Improvement in Telephone-Exchange Apparatus, (Case No. 227,) of which the following is a full, clear, concise, and exact description, reference being had to the accompanying drawings, forming a part of this specification.

My invention relates to telephone-exchange apparatus; and its object is to simplify the apparatus, and thereby prevent accidental interruptions of the circuits, which have heretofore sometimes resulted from the use of the more complicated switching apparatus.

Heretofore telephone-lines extending from the subscribers' stations to the central office have been equipped at the central station with spring-jack switches and annunciators, the object of the spring-jack switches being to effect the disconnection of the annunciator when the line was connected with another. It was necessary thus to open the line at the central office in order to remove the annunciator from the circuit and to take off the ground connection. By my system herein described I am enabled to unite the lines together without disconnecting their annunciators or opening the circuit of the lines, and the annunciators, although left connected, are not liable to be operated, cannot be thrown down, and the ground branches in which they are included do not divert the voice-currents from the connected lines to ground. I avoid the use of spring-jack switches upon the switchboard, simple metallic sockets being substituted in place thereof. Each telephone-line is connected from the subscriber's station thereof to the central office, where it is connected with its socket, the circuit being extended thence through the individual annunciator of the line and through a retardation-coil to ground. An alternating-current generator is used at the central office and when connected to the socket of a line current is sent over the line to ring the subscriber's bell without operating the individual annunciator, which is included with the retardation-coil in the grounded portion of the line at the central office. When my invention is applied to two-cord systems, I preferably provide a clearing-out annunciator in a ground branch from the cords. When used in connection with a single-cord system, I can conveniently provide a key automatically operated by lifting the terminal plug of a line to shunt out the retardation-coil of the line in order that the individual annunciator of the calling-subscriber's line may serve as a clearing-out signal device. By "single-cord system" I mean an exchange in which the telephone-lines are provided each with a flexible cord and plug-terminal, the plug being adapted to be inserted in the socket or switch of another line. By "two-cord system" I mean a telephone-exchange provided with pairs of plugs connected together by flexible cords and so arranged that two lines may be connected together by inserting the two plugs of a pair in the switches, respectively, of the lines. The retardation-coils may be of high resistance—say six hundred ohms—and may be provided with, say, ten thousand convolutions of wire upon the iron. The subscriber may send current from his generator through his individual annunciator and the retardation-coil to operate the individual annunciator. The retardation-coil, however, will act upon voice-currents and alternating currents to prevent such currents from passing to ground. Therefore, although the lines should be permanently connected to ground through their individual annunciators and retardation-coils, these ground connections may be disregarded when the lines are being used for conversation or when current from the operator's calling-generator is being sent over a subscriber's line.

In the drawings, Figure 1 is a view illustrative of two telephone-lines connected from the subscriber's station thereon to the central office, together with the switching apparatus at the central office, the lines being provided with terminal plugs according to the single-cord plan. Fig. 2 is a view showing three telephone-lines connected with the central office, together with the operator's apparatus at the central office, two of the lines being connected together by a pair of plugs and cords.

I will first describe my invention as illustrated in Fig. 1.

Telephone-line $a$ extends normally from ground at station 1 through the generator and bell to the switch and thence to the socket $b$ of the switchboard and thence through the individual annunciator $c$ and the retardation-coil $d$ to ground. The operator's telephone $e$ is included in a normally open ground branch. When the shutter of the annunciator $c$ is thrown down, the line is connected with the telephone at contact $f$ in a well-known way. The branch $g$ from between the socket $b$ and annunciator $c$ extends to the sleeve of the terminal plug $h$. The alternating-current generator $i$ is provided with a branch connecting to the strand of the cord of plug $h$, leading to the tip of the plug thereof. A key $k$ is so placed in connection with the socket of plug $h$ that when the plug is in its socket the shunt around the retardation-coil $d$ will be opened, and when the plug is lifted from its socket this shunt will be closed to cut out the retardation-coil, so that the individual annunciator $c$ may be operative to serve as a clearing-out annunciator. Telephone-line $l$ is connected in a similar manner from ground at its station 2 to socket $l'$ and thence through individual annunciator $l^2$ and through its retardation-coil $l^3$ to ground. A branch $l^4$ extends from between the socket $l'$ and annunciator $l^2$ of line $l$ to the strand $l^5$ of the cord of plug $l^6$.

Suppose subscriber 1 wishes a connection with subscriber 2. The telephone at station 1 being on the switch, subscriber 1 turns his generator, sending current over line $a$ through individual annunciator $c$ to ground through retardation-coil $d$. The shutter of annunciator $c$ being thus thrown down upon telephone-contact $f$, the operator listening at telephone $e$ will answer subscriber 1 and take his order. The operator will then lift plug $h$ from its socket, thus automatically closing the shunt around retardation-coil $d$ to make annunciator $c$ operative and having raised plug $h$ from its socket will touch the tip thereof to connecting-socket $l'$ of line $l$. Now, as before stated, the alternating-current generator $i$ is connected with the tip of plug $h$, and hence current will be sent over line $l$ to ground at station 2, it being understood that the telephone of station 2 is on the hook. When the tip of the plug is thus applied, no appreciable current will be sent to ground through retardation-coil $l^3$, and hence the annunciator $l^2$ will not be thrown down. The operator having thus called subscriber 2 inserts plug $h$ into the socket $l'$, as shown, thus connecting said line $l$ with line $a$ through the strand or branch $g$. The individual annunciators $c$ and $l^2$ of the two lines will remain connected in their ground branches. Since the retardation-coil $d$ is shunted, individual annunciator $c$ may serve as a clearing-out signal.

As shown in Fig. 2, the telephone-lines are connected each from its station to a socket upon the switchboard and thence through an individual annunciator and a retardation-coil to ground after the manner of lines $a$ and $l$ of Fig. 1. Instead, however, of providing a terminal plug for each line I have shown the plugs and cords for connecting the lines together according to the two-cord system. The operator's telephone $m$ is placed in a normally open ground branch, and a switch $m'$ is provided for closing this branch to the circuit of the cords in a well-known way. A clearing-out annunciator $m^2$ may, if desired, be provided in a wire branched from the circuit of the cords to ground. The stations 1 and 3 are shown connected together, the plugs $n$ $n'$ of a pair being inserted in the sockets $o$ $o'$ of the two lines. The telephones of said stations 1 and 3 are shown off the switches as in use for conversation. At station 2 the telephone is shown on the switch. Subscriber 3 in order to obtain connection with subscriber 1 will while his telephone is on the switch operate his generator, sending current to line through individual annunciator $p$ and retardation-coil $p'$. The operator seeing the shutter of annunciator $p$ fall will insert a plug of the pair—for example, plug $n'$—into socket $o'$ of the calling-subscriber's line and depressing key $m'$ will be in communication with said calling subscriber. Having received the order for the line of subscriber 1 she will insert the other plug of the pair into socket $o$ of said line and by depressing calling-key $q$ send current over the line of station 1 to ground at said station. The signaling-current being of the alternating type will not pass to ground through retardation-coil $r$ and so will not operate individual annunciator $r'$. Either of two subscribers thus connected by hanging up his telephone and operating his generator may send current to line to operate clearing-out annunciator $m^2$.

The subscribers' generators as shown in Fig. 1 may be considered as adapted to send straight current, while the subscribers' generators shown in Fig. 2 may be considered as of the alternating type. Thus either type of generator may be used at the subscribers' stations. The subscriber's bell or other signal device is included in the grounded circuit at one portion thereof, and the retardation-coil is connected in the circuit preferably near the ground at the other end of the line. Now when an alternating source of energy is connected to the circuit between the signal device and retardation-coil the alternating current will practically all be directed through the signal device.

My invention admits of various modifications which would readily suggest themselves to those skilled in the art, and I therefore do not limit my invention to the details of construction shown. The broad or primary feature thereof consists in providing retardation-coils in the ground connections of the lines in order that alternating currents, whether voice-currents or signaling-currents, may be prevented from passing to ground through such branches. Thus I am enabled to avoid the necessity of opening such ground branches when the lines are used for conversation or signaling.

As to the prior art, reference is made to Letters Patent No. 283,334, granted Leroy B. Firman August 14, 1883.

Having thus described my invention, I claim as new and desire to secure by Letters Patent—

1. A telephone-line extending from the subscriber's station thereof to the central office, in combination with a socket or connecting device for said line on the switchboard, a source of alternating currents, and an individual annunciator and retardation-coil included in said line between said connecting device and the ground, substantially as and for the purpose specified.

2. A telephone-line connected from ground through the subscriber's bell and generator to a connecting-socket upon the switchboard at the central office and thence to ground through a branch containing an individual annunciator and retardation-coil, in combination with a source of alternating current adapted to be connected to the socket of said line, whereby the subscriber on operating his generator may throw down his individual annunciator, and whereby the alternating current is prevented from passing through the individual annunciator by the retardation-coil, substantially as and for the purpose specified.

3. Two telephone-lines connected together at the central office and a branch from one of said lines including an annunciator and a retardation-coil with a key for shunting the retardation-coil, substantially as and for the purpose specified.

4. The combination with a telephone-line including a bell at the subscriber's station, and an individual annunciator and retardation-coil at the central office, of a source of alternating current, and switching apparatus adapted to connect said source of alternating current with the telephone-line at the central office between the portion of the line containing the said annunciator and retardation-coil and the subscriber's station; whereby the alternating current is directed through the bell at the subscriber's station and prevented from operating the annunciator, substantially as specified.

5. A telephone-line provided with a switch connection upon the switchboard, and connected through an annunciator and an impedance-coil, in combination with a key or circuit-closing device $k$ in a shunt-circuit around the impedance-coil, and a plug adapted when in place to hold said key open, said key closing on the removal of the plug.

6. In a telephone-exchange system, a telephone-line, an impedance-coil and an annunciator included in said line at the central office, and a switch connection for the line on the switchboard, in combination with a key in a shunt-circuit around the impedance-coil, and automatic means for closing said key to shunt the impedance-coil when and while the line is connected with another line.

7. In a telephone-exchange system, two telephone-lines connected for conversation upon the switchboard at the central office, each line being provided with an annunciator and a current-obstructing device (as $d$) in a branch thereof, a by-path including a key or switch (as key $k$) being provided for each such current-obstructing device, said keys remaining normally open, and means for automatically operating said key to close the by-path of the current-obstructing device of a given line on connecting said line with another line, in combination with a source of signaling-current adapted to be thrown upon the united circuit of the two lines at either of the subscribers' stations thereof, to operate the annunciator (as annunciator $c$) of the said line, the by-path of whose obstructing device is closed, without operating the annunciator (as annunciator $l^2$) of the corresponding connected line.

In witness whereof I hereunto subscribe my name this 1st day of March, A. D. 1890.

CHARLES E. SCRIBNER.

Witnesses:
C. G. HAWLEY,
ELLA EDLER.